No. 843,253.  
PATENTED FEB. 5, 1907.
W. A. BARKER.  
FRICTION LOCK.  
APPLICATION FILED MAY 21, 1906.
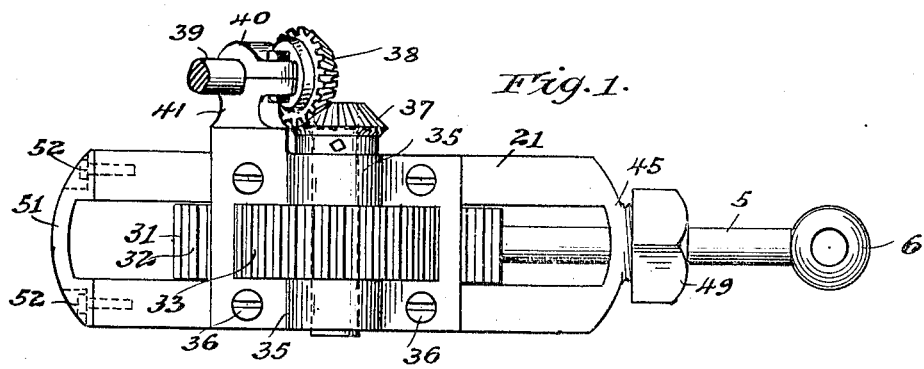
Fig. 1.
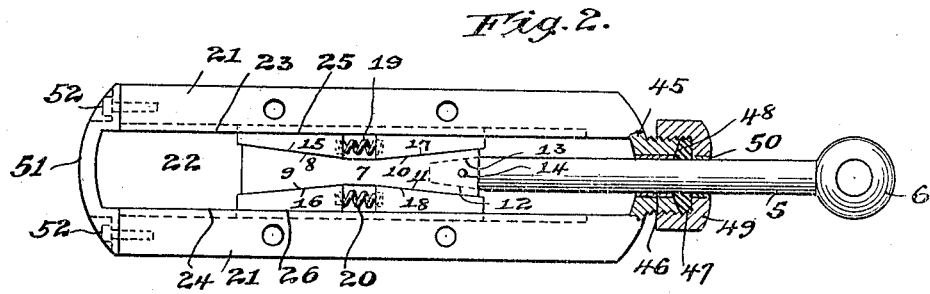
Fig. 2.
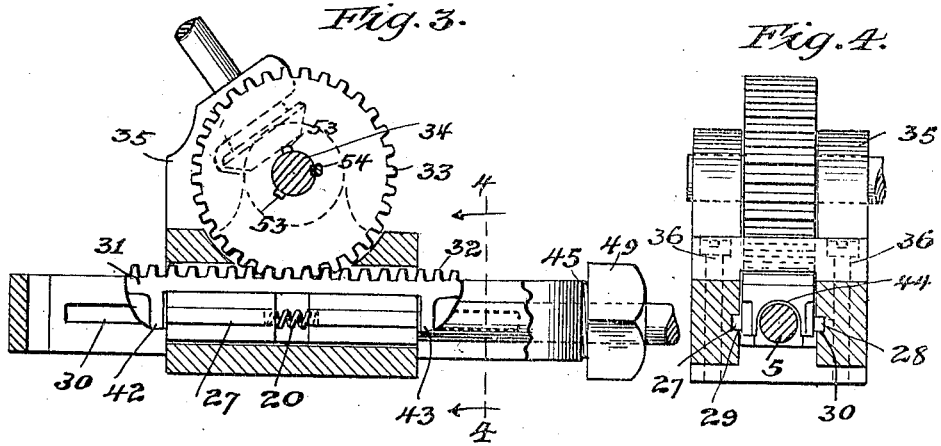
Fig. 3.  
Fig. 4.
Witnesses,  
Inventor,  
Wendell A. Barker  
By Offield Towle and Linthicum,  
Atty's.

UNITED STATES PATENT OFFICE.

WENDELL A. BARKER, OF CHICAGO, ILLINOIS.

FRICTION-LOCK.

No. 843,253.   Specification of Letters Patent.   Patented Feb. 5, 1907.

Application filed May 21, 1906. Serial No. 317,952.

*To all whom it may concern:*

Be it known that I, WENDELL A. BARKER, a citizen of the United States, residing at Chicago, in the county of Cook and State of Illinois, have invented certain new and useful Improvements in Friction-Locks, of which the following is a specification.

My invention relates particularly to a device for controlling the movement of vehicles, and has for one of its objects to provide a mechanism which will prevent the swerving of the vehicle steering-wheels should one or both of them strike an obstacle or irregularity in the road-surface, and it further prevents any jar upon the wheels from being transmitted to the steering-wheel, thereby relieving the operator from a continuous strain when traveling over a rough road-bed, nor is my device alone applicable to a steering mechanism for vehicles, but may be used with great advantage on throttle-valves or like mechanical appliances where permanency is required of the mechanism after being set by the controlling-lever; and, in general, it consists of a device that will instantly and automatically lock itself against any movement of the parts to be controlled.

In the drawings, Figure 1 is a top plan view of my device with the actuating-rod for the same broken away. Fig. 2 is a top plan view with the rack-bar and gears for actuating the same removed. Fig. 3 is a side elevation with parts broken away and other parts in section, and Fig. 4 is a cross-section on the line 4 4 of Fig. 3.

5 represents a connecting or controlling rod provided at one end with the ball-joint 6, adapted to be connected to a steering-knuckle or the like on a vehicle and carrying a block 7, two sides of which each form inclined planes lying in opposite directions, as shown at 8, 9, 10, and 11, one end of said block being recessed, as shown at 12, to receive the end 13 of the controlling-rod, adapted to fit therein and secured by a pin 14.

15, 16, 17, and 18 are wedge-shaped blocks the length of any two being less than the length of the block 7 and the inner faces of which form inclined planes on the same angle as the planes 8, 9, 10, and 11. Two of said wedges are positioned on either side of said block, and interposed between each pair are the springs 19 and 20 to normally press their small ends slightly beyond the ends of said block.

21 is a casing having a recess 22, within which the controlling-rod, block, and wedges travel, the sides 23 and 24 of said recess being parallel to each other and to the outer faces 25 and 26 of the wedges to have a frictional engagement therewith, and to preserve a true alinement of the parts within the recess I form ribs 27 and 28 upon the parallel faces of the wedges, adapted to run in the grooves 29 and 30, formed in the sides of the recess.

Fitting within the recess in the casing and adapted to slide therein is a releasing member or rack-bar 31, provided with the teeth 32, intermeshing with the gear-wheel 33, which is keyed upon an axle 34, journaled in a casing 35, which is secured to the casing 21 by the bolts 36. One side of the gear-wheel 33 is provided with a toothed face 37, adapted to intermesh with the bevel gear-wheel 38, which is rigidly mounted upon and rotated by the rod 39, upon which a steering-wheel is mounted, said rod having a bearing 40 in a projecting arm 41, formed integrally with the casing 35. At both ends of the releasing member there are depending lugs 42 and 43, preferably formed integrally therewith and cut away, as shown at 44, to pass over the controlling-rod and fall below the outer ends of the wedges to come in contact with their small ends on a movement of the releasing member in either direction.

On one end of the casing 21 I form a neck portion 45, apertured to afford a journal-bearing 46 for the controlling-rod and slightly cut away, as shown at 47, to provide a packing-box 48, said neck portion being exteriorly threaded to receive a nut 49, centrally apertured, as shown at 50, to permit the controlling-rod to pass therethrough, and in order to facilitate the ready assembling of my device I form one end of the casing 21 separate therefrom, as shown at 51, and secure said end to said casing by the bolts 52. I prefer to construct the gear-wheel 33 somewhat larger than is necessary to move the releasing member its full length and provide said wheel and axle 34 with registering keyways 53, adapted to receive a key-pin 54, so that when the gears become worn a new series of teeth may be presented to operate the releasing member by keying the gear on the axle at a different position, said gear being of sufficient circumference to provide three series of teeth for operating said releasing member, assuming my device is suitably connected to a vehicle by rigidly connecting the casings 21 and 35 to the vehicle-body or like support and further connecting the controlling-rod by means of the ball-joint to the steering-knuckle on a wheel or any other suitable connection to the wheel.

The operation of my device is as follows: Rotating the gear-wheel 33, as shown in Fig. 3, from right to left, the releasing member will be moved to the right when the depending lug 42 comes in contact with the small ends of the wedges 15 and 16, moving the same down the inclined planes on the block 7 until the lug comes in contact with the block itself, whereupon the frictional engagement between the wedges 15 and 16, the block 7, and the sides of the recess is relieved and the block moves readily forward. This movement also relieves the friction from the wedges 17 and 18. Consequently the controlling-rod is moved forward, which imparts a corresponding movement to the wheels, the reverse movement and operation being identical, except that the wedges 17 and 18 are moved upon the inclined planes on the block until the lug 43 comes in contact therewith, and the controlling-rod is drawn backward. The wedges are normally in a wedged position, and it is not until one of the lugs comes in contact with their small ends that the controlling-rod may be moved. Consequently any pull or pressure upon the operating end of the controlling-rod from which it is attached to the block would fail to move it from its wedged position, and therefore any obstacles in the road would fail to deviate the wheels from their true course.

It is obvious that various changes might be made in my invention without departing from the broad general principles, and therefore Without limiting myself to the precise details of construction, what I claim is—

1. The combination with a connecting or controlling rod, of a friction-lock therefor, said lock comprising a plurality of wedge members, a casing inclosing said wedge members, a series of springs interposed between said wedges to normally press them against said casing, and a releasing member adapted by its initial movement to release the lock, and by a further traverse to move the controlling-rod, substantially as described.

2. The combination with a connecting or controlling rod, of a friction-lock therefor, said lock comprising a block, having inclined surfaces attached to said rod, wedge members having corresponding inclined surfaces to said block, a casing inclosing said block and wedge members, a series of springs interposed between said wedges to normally press them against said block and casing, and a releasing member adapted by its initial movement to release the wedges and by a further traverse to move the controlling-rod, substantially as described.

3. The combination with a connecting or controlling rod, of a friction-lock therefor, said lock comprising a block, having inclined surfaces, attached to said rod, wedge members having corresponding inclined surfaces to said block, a casing inclosing said block and wedge members, a series of springs interposed between said wedges to normally press them against said block and casing, and a movable releasing member provided with lugs adapted to be moved into contact with said wedge and block members, to release the wedges, and by a further traverse to move the controlling-rod, substantially as described.

4. The combination with a connecting or controlling rod, of a friction-lock therefor, said lock comprising a block, having inclined surfaces, and attached to said rod, wedge members having registering inclined surfaces with the inclined surfaces on said block, a casing inclosing said block and wedges, springs interposed between said wedges to normally press them against said block and casing, a releasing member provided with lugs, and means for moving said releasing member into contact with said wedge and block members to release the wedges and by a further traverse to move the controlling-rod, substantially as described.

5. The combination with a connecting or controlling rod, of a friction-lock therefor, said lock comprising a block having inclined surfaces and attached to said rod, wedge members having inclined and parallel surfaces, said inclined surfaces registering with the inclined surfaces on said block, longitudinal ribs on the parallel surfaces, a casing inclosing said block and wedges, grooves in the sides of said casing in which said ribs are adapted to slide, springs interposed between said wedges to normally press them against said block and casing, a releasing member provided with lugs, means for moving said releasing member whereby the lugs are brought into contact with the small ends of said wedge members to release the wedges, and by a further traverse to move the controlling-rod, substantially as described.

WENDELL A. BARKER.

Witnesses:
FREDERICK C. GOODWIN,
JAMES R. OFFIELD.